United States Patent [19]

McGrath

[11] 4,203,194

[45] May 20, 1980

[54] BATCH METHOD FOR MAKING SOLID-ELECTROLYTE CAPACITORS

[75] Inventor: N. Christian McGrath, Strafford, N.H.

[73] Assignee: Sprague Electric Company, North Adams, Mass.

[21] Appl. No.: 925,127

[22] Filed: Jul. 17, 1978

[51] Int. Cl.² .............................................. B01J 17/00
[52] U.S. Cl. ...................................... 29/570; 427/25; 427/27
[58] Field of Search .................... 29/570, 588; 427/25, 427/27

[56] References Cited

U.S. PATENT DOCUMENTS

| 3,019,126 | 1/1962 | Bartholomew | 427/29 |
| 3,248,253 | 4/1966 | Barford | 427/25 |
| 4,090,288 | 5/1978 | Thompson | 29/570 |

Primary Examiner—W. C. Tupman
Attorney, Agent, or Firm—Connolly and Hutz

[57] ABSTRACT

A plurality of porous valve-metal pellets are suspended by their anode riser wires from a holding bar. After the conventional steps of anodically forming an oxide film over the surfaces of the pellets and depositing a solid electrolyte and a metallic counterelectrode over the film, an insulative resin layer is applied over the pellets by an electrostatic fluidized powder-bed coating step, selective air-stream powder-removal steps and heat curing steps. Anode and cathode end cap terminals are subsequently formed over opposite ends of each pellet, preferably by applying and curing a silver loaded paint, curing the paint, nickel immersion plating over the silver and cladding the nickel film with solder.

13 Claims, 3 Drawing Figures

150
BATCH METHOD FOR MAKING SOLID-ELECTROLYTE CAPACITORS

BACKGROUND OF THE INVENTION

This invention relates to a batch method for making solid-electrolyte capacitors and more particularly to such capacitors having metal loaded resin end caps.

Capacitors having end cap terminals are especially suitable for flush mounting to a printed wiring board, or the like, usually by reflow soldering thereto. An insulative layer is normally provided over a major portion of a capacitor pellet, which pellet includes a porous valve-metal core having an oxide dielectric film formed over its surfaces, a solid electrolyte over the film and a metallic counterelectrode over the solid electrolyte. A metal loaded resin paint is applied over opposite ends of the pellet and partially over the insulative layer. One paint layer contacts the counterelectrode and the other contacts a valve-metal riser wire extending from the core.

The insulative layer may be applied by dipping the pellet into a liquid resin and curing the resin. This resin is removed from the pellet in predetermined region by blotting and wiping as is described by Thompson et al in U.S. Pat. No. 4,090,288, issued May 23, 1978 and is assigned to the same assignee as the present invention. Such procedures are amenable to batch fabrication of capacitors. However, much care is needed in the dipping step to control the amount of resin that is deposited in the critical region of the pellet from which the anode riser wire extends. Also if the pellets are subsequently immersed into activating and plating electrolyte solutions the insulative coating must be free of porosity and pin holes and be impervious to such electrolytes which may seriously damage the underlying solid electrolyte and dielectric oxide film. Such damage results in higher dissipation factors, higher leakage currents and sometimes shorting of the capacitor.

It is therefore an object of this invention to provide a low-cost batch method for making solid electrolyte capacitors with a precisely defined and impervious insulative coating over which terminal caps are applied.

SUMMARY OF THE INVENTION

A batch method for making solid electrolyte capacitors includes suspending a plurality of porous valve-metal pellets from a holding bar, anodically forming an oxide film over the surfaces of the pellets, disposing a solid electrolyte over the film of each pellet and depositing a conductive counterelectrode layer over the solid electrolyte of each pellet.

The suspended pellets are then brought to a fluidized bed of fusible insulative resin powder and a high d.c. voltage is applied between the holding bar and the fluidized bed to electrostatically form a powder coating on the suspended pellets. This may be accomplished by holding the pellets just over the bed or by submersing them into the bed.

The powder coating is then selectively removed from a face of each pellet to expose the counterelectrode layer there. This is preferably accomplished by the simple and accurate means of directing a sharply defined gas stream at the bottom end face of the pellets which preferably have all been registered in one plane.

The pellets are each typically suspended by a riser wire extending from a top face of the pellet. The electrostatic coating step also causes the powder to extend over the wire.

A sharply defined gas stream is preferably directed at a middle region of each wire to selectively remove the coating from the middle wire regions.

The pellets are heated to fuse and cure the remaining portions of the powder coatings. An anode terminal is formed over the face of the pellet from which the wire extends so as to contact the wire. A cathode terminal is formed over the opposite pellet face and in contact with the counterelectrode. The wires are then severed to separate the pellets from the bar. It will be appreciated that all steps necessary for forming completed capacitors may be accomplished by batch steps prior to the wires being severed.

The electrostatic deposition of an insulative powder from a fluidized bed onto a counterelectroded solid electrolyte pellet leads to a dense uniformly thick insulative coating after heat curing. The uniformity in coating thickness is somewhat surprising in view of the variously disposed insulative and conductive materials of the pellet. Furthermore the fluffy powder coating becomes, after curing, an exceptionally dense impermeable coating. This dense coating in combination with subsequent immersion into activation and nickel plating electrolytes for forming terminations, is advantageously superior to the coatings formed by dip and spray methods known in the art for preventing penetration of these electrolytes through the coating to the chemically sensitive solid electrolyte and dielectric oxide of the pellet. Capacitors made in accordance with the electrostatic coating steps of this invention exhibit a reduction in the incidence of degradation in electrical properties, especially leakage current and dissipation factor particularly after accelerated life tests.

Yet a further advantage of electrostatically depositing the coating is that at the pellet corners, e.g. at the junction of two adjacent pellet faces, the coating is essentially as thick as it is elsewhere, unlike in the dipped coatings or sprayed coatings which tend to thin out at the corners leading to a greater incidence of shorts between the solid electrolyte and a conductive termination over the coating.

An outstanding advantage of the method of this invention lies in the combination of electrostatic powder deposition and selective removal of the powder coat prior to coating. This removal step may be easily and accurately accomplished using a sharply defined stream of air to remove the powder from any predetermined region on a pellet. It is amenable to selective removal of the powder on a plurality of capacitors either by an individual, a batch or a sequential mode. The almost surgical precision with which powder is selectively removed from a middle region of an anode riser wire, leaving a small precise amount of powder on this wire at its point of egress from a pellet, is highly advantageous here for assuring insulation in the finished capacitor between the wire and the solid electrolyte where the valve metal oxide dielectric film stops and the wire is connected to the anode terminal. Further, the removal of dry powder from a region of the counterelectrode provides a very clean counterelectrode surface to which a subsequently applied cathode therminal tends to make better electrical and mechanical connection than after the removal, as in the prior art, of an uncured liquid insulating resin from such counterelectrode regions.

DESCRIPTION OF THE PREFERRED EMBODIMENT

Figure 1:
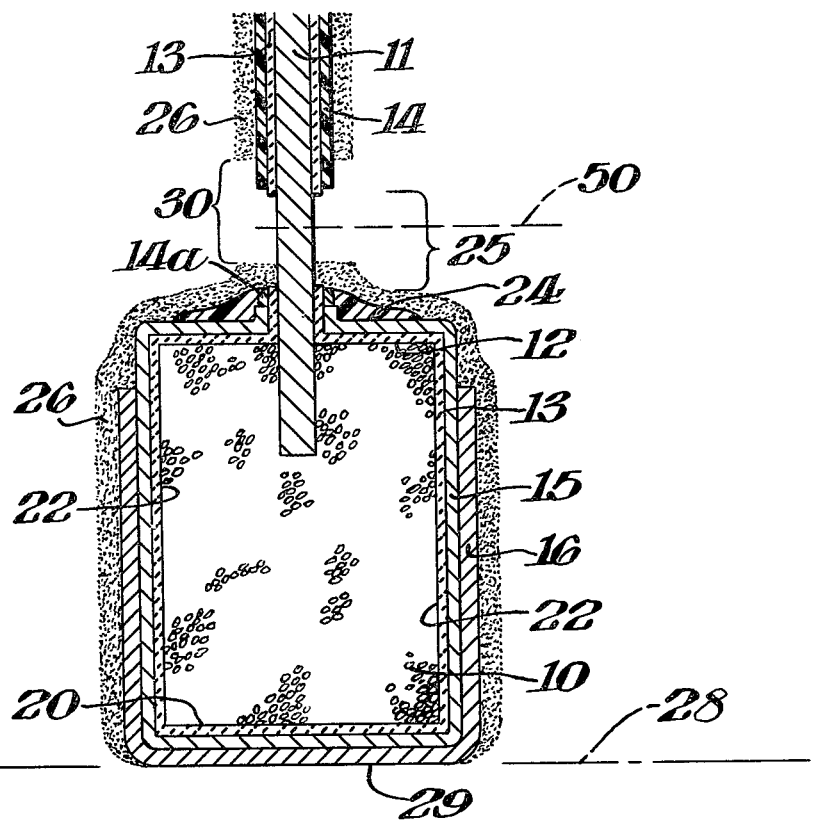
FIG. 1 shows in side sectional view a counterelectroded solid electrolyte tantalum capacitor having an electrostatically adhering powdered resin coating in accordance with the method of this invention.

In FIG. 1, a porous tantalum pellet 10 is shown having a tantalum riser wire 11 extending from the top end face 12 thereof. The pellet 10, having the shape of a right parallelepiped, has a tantalum oxide film 13 anodically formed over all pellet surfaces and extended up along the wire 11. A fluorocarbon resin film 14 (TEFLON) covers the oxide filmed riser wire, having been applied prior to the conventional step of applying manganous nitrate solution to the pellet and pyrolytically converting the nitrate to $MnO_2$. The film 14 is not wet by the nitrate solution and prevents the formation of $MnO_2$ over the riser wire. Any other non-wettable material that will withstand the temperatures, to which the pellets are subjected during the pyrolysis of the manganous nitrate, will be suitable.

A solid electrolyte layer 15 of manganese dioxide overlies the oxide film 13. A composite counterelectrode layer 16 having a first layer of graphite and a cured overlayer of silver paint, is deposited over the solid electrolyte layer 15. The counterelectrode layer 16 covers the bottom end face 20 of pellet 10. Layer 16 also covers a major portion of the four side faces 22 of the pellet 10. Of course, when a cylindrical pellet is employed, there is only one side face, but in any event the side face or faces are contiguous with the two end faces.

The counterelectroded pallet 10, thus far described, is typical of solid electrolyte tantalum capacitors known in the art. The methods by which a plurality of tantalum pellets are suspended from a metal bar by their anode riser wires and subsequently have the dielectric film, the solid electrolyte layer, and the counterelectrode formed thereon, are also well known.

Figure 2:
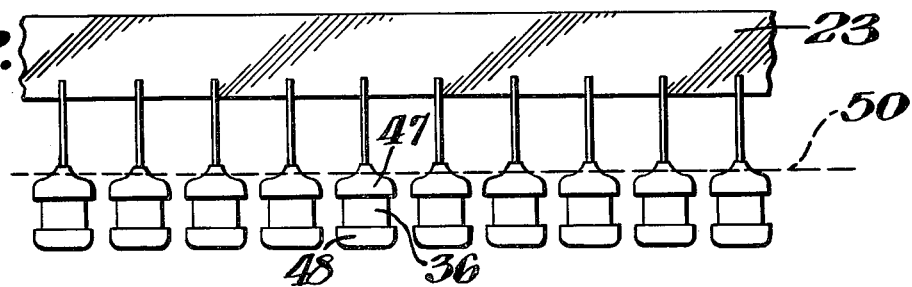
FIG. 2 shows in side view a portion of a carrier bar to which there are attached in a row a plurality of terminated chip-style capacitors having been made by the method of this invention.

In accordance with this invention, twenty four capacitors having been attached by their anode wires to a carrier 23 as shown in FIG. 2 and built up as described above, are painted by brushing at the pellet tops with an epoxy resin. The resin is heat cured to form a hard epoxy plug 24, which bonds to the $MnO_2$ layer 15 and covers a portion of the resin coating 14 over the riser wire 11. The oxide film 13 and the resin film 14 are removed from an outwardly extending portion of the riser wire 11 in the region 25, by sand blasting. The plug 24 serves as a sand blasting mask to a small portion of the fluorocarbon-resin film, 14a, as seen in the finished capacitor of FIG. 3. This remaining film portion 14a serves the important function of preventing during the aforementioned sand blasting any bridging of $MnO_2$ particles across the cut end of the dielectric oxide film 13.

The suspended pellets are then immersed into a fluidized bed of fusible epoxy powder, namely HYSOL DK-18-05, made by Hysol Corp., Olean, N.Y. A high voltage d.c. power supply is connected between the bar 23 and an electrode in the fluidized bed. About 30,000 volts is applied which causes the powder to be electrostatically attracted to the pellet bodies and to form a continuous uniform powder coating 26 lightly adherent to the bottom and side surfaces of the counterelectrode, to any exposed areas of the solid electrolyte 15, and to at least the initially extending portion of the coated riser wire 11 of each capacitor. The pellets are removed from the bed after 5 to 10 seconds to obtain a suitably thick powder coating 26.

The thickness of the powder coating 26 is directly related to the time of exposing of the pellets in the electrostatic fluidized bed. A 6 second period was chosen. A particularly efficient means for easily obtaining and controlling this exposure time consists in pneumatically maintaining the powder bed in the fluidized state, immersing each group of pellets that are attached to a carrier bar into the fluidized powder, switching on the high voltage for the desired coating period, e.g. from 5 to 10 seconds, and removing the group of pellets from the bed. An electro-mechanical timer is employed to accurately and repeatably determine the period of activation of the electrostatic field.

The powder coated pellets are supported by a fixture that fixes the plane 28, which is defined by the bottom surfaces 29 of the counterelectroded pellets, in a horizontal position. A sharply defined air stream, also being substantially confined to the plane 28 is directed toward the suspended pellets to blow away the portion of the powder coating 26 which overlies the bottom surface of the counterelectrode layer 16.

In like manner, a sharply defined stream of air is directed perpendicularly toward the anode riser wire 11 to blow away a portion of the powder coating which overlies a middle region 30 of the wire. The middle region 30 partially overlaps the region 25 so that an oxide-bare and powder-coating-bare region of the riser wire 11 is exposed. The powder-coating portion which remains over the pellet 10 extends a short way up the wire 11, namely about 0.025 inch (0.6 mm), so that upon subsequent heating, it will flow so as to bridge over the fluorocarbon film portion 14a.

A pellet 10 having been brought to this point in the manufacturing process is illustrated in FIG. 1. In the above-noted powder-coating selective removal process, a fan-shaped air stream is produced in a horizontal plane by leading a source of compressed air into a nozzle having a rectangular orifice, the rectangle having a lateral dimension of 0.08 inch (2 mm) and a vertical dimension of 0.008 inch (0.2 mm). The compressed air is set at a pressure of about 10 psi for removing the powder from the anode wire in region 30, and is set at 10 psi to clear the powder from the bottom surface 29 of the counterelectrode. In general, the air stream may have any other convenient geometry so long as it is sharply defined to permit the accurate removal of the desired powder coating portions without disturbing those which it is desired should remain adhered to the capacitors. The thin stream has the advantage that a minimum volume of fast moving air is introduced in the vicinity of the capacitors and the potential for inadvertent removal of the powder coating portions that desirably remain adhered is reduced.

A bar of capacitors may now be inspected to determine whether the powder coating covers the pellets and anode wires in the proper places. If defects are seen, the powder is simply removed by blowing it away. The removed powder may be collected for return to the bed.

The pellets are not lost either. They may then be recoated properly and subjected to the powder curing and subsequent processing steps. Thus adjustments may be made in the coating and selective removal processes without interrupting the flow of material in a mass production facility, and with no material waste whatever.

The selectively powder-coated capacitors are then placed in a vacuum-type oven, being mounted and held there by the carrier bar. They are heated to about 85° C. in a partial air atmosphere of about 500 mmHg for 15 minutes, to fuse the powder coating and transform it into a gel coating that is free of bubbles. This step is also advantageous for preventing hot organic vapors of the hot expoxy from entering the manganese dioxide layer 14, reducing portions of it to a highly resistive oxide and ultimately leading to a high dissipation factor of the capacitors. These preventative purposes are generally achieved when the atmospheric pressure is maintained at less than 600 mmHg.

Figure 3:
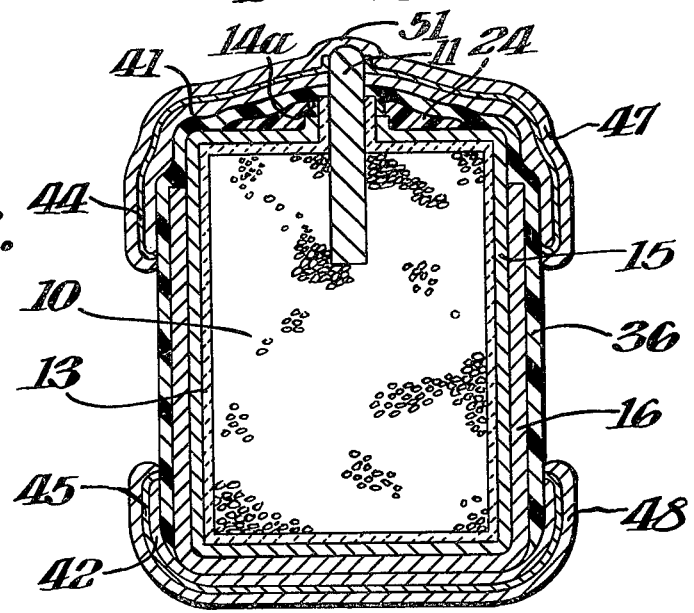
FIG. 3 shows in side sectional view a capacitor of FIG. 2 having been separated from the carrier bar.

The capacitors are subsequently heated in a reduced pressure atmosphere or alternatively in a forced draft oven at a temperature of about 150° C. for 30 minutes to assure a complete cure of the resin coating 26 to form a tough protective coating 36 as seen in FIG. 3.

It is preferred to prebake the pellets prior to applying the powder coating 26 in order to remove moisture from the $MnO_2$ layer 15 and to remove volatile organic material from the counterelectrode 16. The pellets are then allowed to cool to room temperature prior to the powder coating step. This prebaking is best accomplished in a vacuum oven at about 500 mmHg at a temperature of 125° C., helping to prevent contamination of the $MnO_2$ by these materials and to prevent blistering of the subsequently applied resin coating 36.

In the process of this invention, the function of the epoxy plug 24 is unique. It is known in the art to employ such a plug at this critically important region of the capacitor, namely at the region of egress of the riser wire from the pellet. In the past such a plug served, in the absence of an anode riser wire protective coating 14, to prevent manganous nitrate from being deposited on the riser wire. It thus subsequently prevented the presence of $MnO_2$ at the regions of the riser wire that may be flexed causing cracks in the overlying oxide film or at the regions of the riser wire at which the wire was later to be cut, in both instances leading to $MnO_2$ bridging of the dielectric oxide film to the anode riser wire.

In the process of this invention, $MnO_2$ bridging is prevented by the non-wettable fluorocarbon resin coating 14 and not plug 24. This very desirable non-wettable property of coating 14, unfortunately, leads also to the de-wetting of the subsequently applied epoxy gel coating (having essentially the form and position of the finally cured epoxy coating 36 as seen in FIG. 3). The rejection by the fluorocarbon coating 14 of the coating 36 in its precured liquid condition, causes the liquid resin to withdraw and become spaced from the anode wire at this most critical region of the capacitor. The painted resin plug 24 is easily applied to thicknesses of more than 0.010 inch (0.25 mm), and typically with a wide variety of epoxy resin formulations to a thickness of from 0.015 to 0.020 inch (0.38 to 0.51 mm). On the other hand the thickness of the resin coating 36 is desirably much thinner, namely less than 0.010 inch (0.25 mm), and preferably 0.005 inch (0.13 mm) in order to make control of the sag and flow in the curing coating 36 non-critical and to minimize the overall size of the finished capacitor.

The thick plug 24, also tends to withdraw in the uncured viscous state from the fluorocarbon-resin coating 14, but the plug in this instance serves only as a shield during the aforementioned sand blasting of the riser wire so that this withdrawal and any consequent gap has no practical consequence, because the overlying resin coating 36 subsequently adheres to the readily wettable epoxy plug 24 and bridges over the end of the fluorocarbon resin film portion 14a to the sand blasted anode riser wire portion in the region 25.

It has been found that when the plug 24 is omitted, and the sand blasting in region 25 is performed after the curing of the resin coating 36, the yield of finished capacitors having a low dissipation factor or high leakage current may be as high as 80%. When the plug 24 is included, however, the yields are nearly 100%. Thus the plug 24 is not essential but it is greatly preferred.

The pellets are now ready to have conductive anode and cathode terminals applied thereto. These may be of the conformal metal particle paint type or of the preformed metal cap type as is described in U.S. Pat. No. 4,064,611 issued Dec. 27, 1977 and is assigned to the same assignee as the present invention.

In this embodiment, the suspended capacitors are subjected to a selective spraying of a silver loaded paint at the top and bottom end faces thereof. The paint coating is heat cured to form cup-shaped terminal layer 41 and 42 over the top and bottom end faces of each capacitor, respectively. The cup-side portions of each of the silver layers 41 and 42 overlie only a minor portion of the side face(s), and are spaced from each other.

By sand blasting in about the region 25, the cured silver layer is removed from the anode wire 11 in this region. The capacitors are then cleaned and the silver surfaces deoxidized by submersion in an acidified detergent solution, namely, Cleaner-Conditioner 1110 supplied by the Shipley Company, Newton, Mass. Next, the capacitors are rinsed and submersed for 3 minutes in a water solution containing about 7 percent of Activator #440, a palladium chloride solution supplied by the Enthone Corporation, West Haven, Conn. After rinsing again, the capacitors are completely submersed for 40 minutes at 95° C. in ENTHONE 416M, a nickel immersion plating solution supplied by Enthone Corp., to selectively deposit about 0.001 inch (0.025 mm) thick nickel film 44 over the anode silver layer 41 and the adjacent bared portion of the riser wire 11, as well as to deposit a nickel film 45 over the cathode silver layer 42. The bond between the nickel film 44 and the tantalum wire 11 provides a very reliable electrical contact which does not alter the dissipation factor of the capacitors as measured between the two nickel films 41 and 45.

After another rinse, the freshly plated capacitors are dried in a vacuum oven at a pressure of 500 mmHg for 1 hour at 125° C. to insure that moisture absorbed by the epoxy encapsulant during the plating process has been driven off and removed.

The capacitors are then rinsed again, dried, fluxed and dipped into a pot of molten solder to form solder layers 47 and 48 over the nickel films 44 and 45, respectively.

The resin coating 36, being sealed against the anode wire 11, prevents the chemically active plating solutions from reaching the sensitive $MnO_2$ layer 15 at the stem of the wire 11.

The anode wires 11 are then severed along a line 50 as indicated in FIG. 1 by a laser which also locally heats and reflows the solder so that it flows over the end of the remaining portion of anode wire 11, and advantageously forms a solder seal 51 there.

What is claimed is:

1. A batch method for making solid-electrolyte capacitors including providing a plurality of porous valve-metal pellets each having one end face from which a wire of said valve-metal extends, an opposite end face and at least one side face being contiguous with said two end faces; suspending said pellets by their respective wires from a holding bar; anodically forming an oxide film over the surfaces of each said porous pellet; disposing a solid electrolyte over said film of said each pellet; and depositing a conductive counterelectrode layer overlying said solid electrolyte of said each pellet in a region over said at least one side face and extending over said opposite end face thereof; wherein the improvement comprises:

(a) bringing said suspended pellets to a fluidized bed of a fusible insulative resin powder and applying a high d.c. voltage to said holding bar with respect to said fluidized bed to electrostatically form a powder coating on said suspended pellets and on said wires;

(b) selectively removing said powder coating from said opposite end face of said each pellet to expose said counterelectrode layer;

(c) heating said suspended pellets to fuse and cure the remaining portions of said powder coatings;

(d) subsequently forming an anode terminal over said one end face of each said pellet in contact with the corresponding of said wires, and forming a cathode terminal spaced from said anode terminal over said opposite end face of each said pellet in contact with said counterelectrode; and (e) severing said wires to separate said pellets from said bar.

2. The method of claim 1 wherein said removing is accomplished by directing a sharply defined gas stream at said opposite end faces to selectively blow away said powder therefrom.

3. The method of claim 2 wherein said directing is in a plane corresponding essentially to the plane of said opposite end face of said each pellet.

4. The method of claim 1 additionally comprising directing a sharply defined gas stream at a middle region of said each wire to selectively remove said powder coating from said middle wire regions.

5. The method of claims 2 or 4 wherein said gas is air.

6. The method of claim 1 wherein said bringing and applying is accomplished simultaneously with respect to said plurality of pellets.

7. The method of claim 1 wherein said resin powder is fusible epoxy resin.

8. The method of claim 7 wherein said heating is accomplished by first holding and heating at one temperature said suspended pellets by said bar in a vaccum type oven to fuse and transform each of said powder coatings to a gel coating, and subsequently curing said gel coating to a hard coating at a higher temperature than said one temperature.

9. The method of claim 8 wherein said heating in said vacuum oven is for about 15 minutes in a reduced pressure atmosphere less than 600 mmHg, said one temperature being about 85° C.

10. The method of claim 1 wherein said terminal forming steps are accomplished prior to said severing and comprise spraying a conductive paint at said pellet ends to form two spaced cup-shaped layers over said one and said opposite end faces of said each pellet, respectively, and curing said paint layers.

11. The method of claim 1 wherein said forming of said terminals includes applying a silver containing paint, heating to cure said paint, and selectively plating a nickel film over said cured silver paint.

12. The method of claim 11 additionally comprising baring a portion of said each wire prior to said plating so that said nickel film extends from over said one end face and contacts said bared portion.

13. The method of claim 11 wherein said plating is accomplished by submersing said plurality of pellets into a nickel immersion plating solution.

* * * * *

UNITED STATES PATENT OFFICE
CERTIFICATE OF CORRECTION

Patent No. 4,203,194     Dated May 20, 1980

Inventor(s) N. Christian McGrath

It is certified that error appears in the above-identified patent and that said Letters Patent are hereby corrected as shown below:

Column 2, line 48, "coating" should read -- curing --

Column 3, line 41, "pallet" should read -- pellet --

Column 3, line 50, after "carrier" insert -- bar --

Signed and Sealed this

Twenty-sixth Day of August 1980

[SEAL]

Attest:

SIDNEY A. DIAMOND

Attesting Officer     Commissioner of Patents and Trademarks